United States Patent [19]

Watanabe et al.

[11] Patent Number: 5,357,272
[45] Date of Patent: Oct. 18, 1994

[54] DEFLECTION SCANNER WHICH IS ELASTICALLY FIXED IN ITS HOUSING

[75] Inventors: Hideaki Watanabe, Akita; Mikio Nakasugi, Chofu, both of Japan

[73] Assignee: Canon Kabushiki Kaisha, Tokyo, Japan

[21] Appl. No.: 916,628

[22] Filed: Jul. 22, 1992

[30] Foreign Application Priority Data

Jul. 29, 1991 [JP] Japan .................. 3-211483
Jul. 29, 1991 [JP] Japan .................. 3-211484
Nov. 13, 1991 [JP] Japan .................. 3-297186

[51] Int. Cl.⁵ .................. G01D 9/42; F16C 27/00
[52] U.S. Cl. .................. 346/108; 359/198; 359/200; 384/535; 310/90
[58] Field of Search ............. 346/108, 160; 359/198, 359/200, 216, 217, 218, 219, 212; 384/535; 310/90

[56] References Cited

U.S. PATENT DOCUMENTS

| | | | |
|---|---|---|---|
| Re. 33,721 | 10/1991 | Sato et al. | 359/198 |
| 4,623,216 | 11/1986 | Sato et al. | 350/6.8 |
| 4,800,401 | 1/1989 | Sato et al. | 346/108 |
| 4,805,972 | 2/1989 | Tanaka et al. | 359/200 |
| 4,934,836 | 6/1990 | Tanaka et al. | 359/200 |

FOREIGN PATENT DOCUMENTS

| | | |
|---|---|---|
| 382221 | 8/1990 | European Pat. Off. . |
| 444651 | 9/1991 | European Pat. Off. . |
| 59-197010 | 11/1984 | Japan . |
| 63-191117 | 8/1988 | Japan . |

*Primary Examiner*—Benjamin R. Fuller
*Assistant Examiner*—Randy W. Gibson
*Attorney, Agent, or Firm*—Fitzpatrick, Cella, Harper & Scinto

[57] ABSTRACT

A deflection scanner has a container for accommodating a deflector and lens. The deflector is adapted to be rotated by a driving motor which is supported by a bearing so as to deflect and scan a light beam emitted from a light source. The housing of the driving motor is fixed on the container by use of an elastic member instead of screws.

37 Claims, 14 Drawing Sheets

DEFLECTION SCANNER WHICH IS ELASTICALLY FIXED IN ITS HOUSING

BACKGROUND OF THE INVENTION

1. Field of the Invention

The present invention relates to a deflection scanner for, for example, a laser beam printer using a rotator held with a ball bearing.

2. Related Background Art

A precise ball bearing has been employed for a rotator that rotates at a high speed or with high precision and is designed, especially, for a laser beam printer.

FIG. 1 shows an example of prior art of a deflection scanner for use in a laser beam printer. A flange 2 is pressed into a rotating shaft 1. A rotary polygon mirror 3 is placed on the flange 2. A yoke 4 is fixed under the flange 2. A drive magnet 5 is fixed on the inner surface of the yoke 4 and opposed to a stator coil 6. The drive magnet 5 and stator coil 6 form a drive motor to rotate the rotary polygon mirror 3 via the rotating shaft. The rotating shaft 1 is fitted into an inner ring of a ball bearing 8 pressed into a housing 7. The housing 7 is fixed in an optical case 10 with screws 9.

In the foregoing example of prior art, the screws 9 are used to fix the housing 7 in the optical case 10. The screws 9 are arranged outside so as not to interfere with the rotating yoke 4. Therefore, the housing 7 becomes large in size. This may result in a heavy or high-cost scanner. Moreover, four to five screws 9 are employed, increasing the number of parts, man-hours, and cost.

SUMMARY OF THE INVENTION

The object of the present invention is to solve the aforesaid problems, obviate screws, design a compact housing, and thus provide a light-weight and low-cost deflection scanner.

To achieve the above object, the present invention provides a deflection scanner in which a deflector rotated by a drive motor held with a bearing to deflect and scan a light beam and a means for converging the light beam on a scanning object are encased in a container. Herein, the housing of the drive motor is fixed in the container by using an elastic member.

In a deflection scanner having the foregoing configuration, a housing containing a ball bearing is placed in an optical case. An elastic member is engaged with a recess formed in the lower part of the housing, thus securing the housing and optical case.

DETAILED DESCRIPTION OF THE PREFERRED EMBODIMENTS

Figure 1:
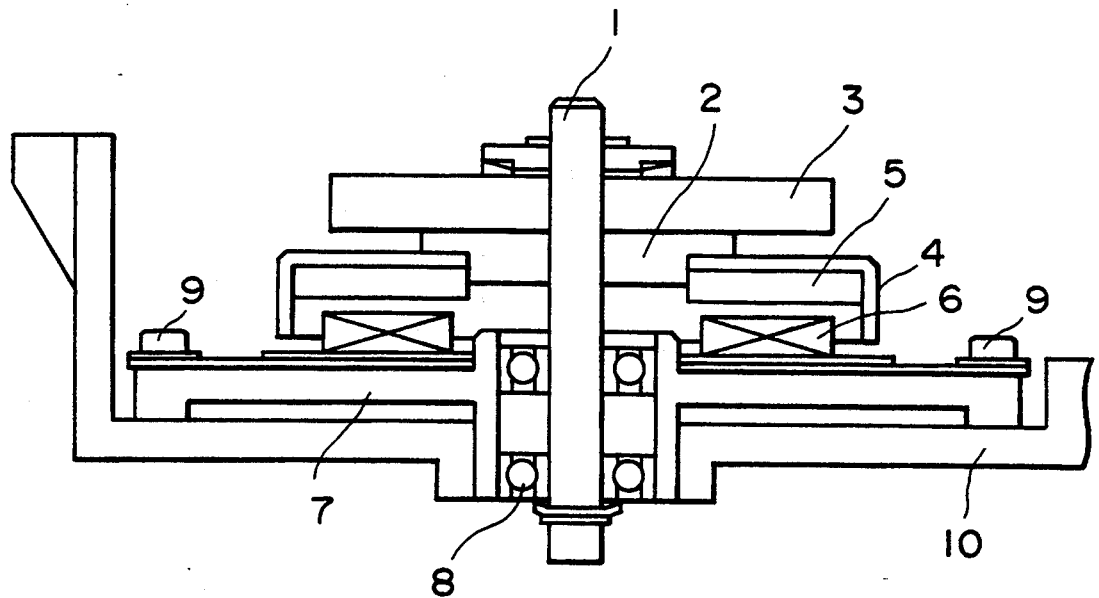
FIG. 1 is a cross-sectional diagram showing an example of prior art.

A deflection scanner of the present invention will be described in conjunction with the embodiments shown in the drawings.

Figure 2:
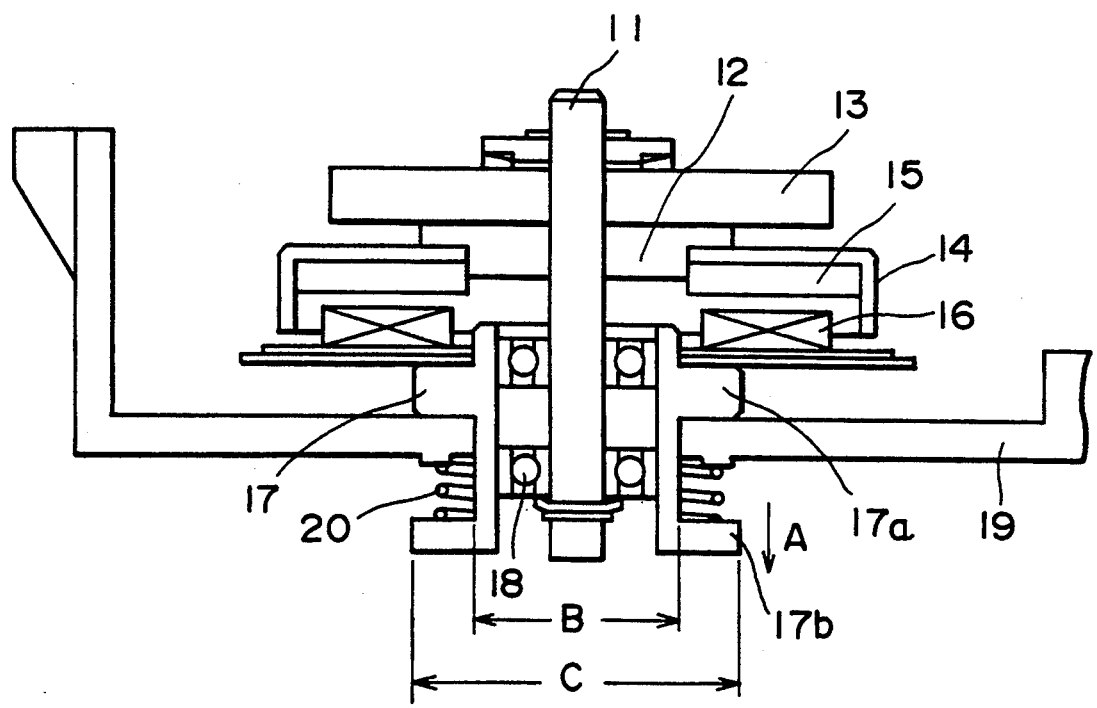
FIG. 2 is a cross-sectional diagram showing the first embodiment.

FIG. 2 is a cross-sectional diagram showing the first embodiment. A flange 12 is pressed into a rotating shaft 11. A rotary polygon mirror 13 serving as a deflector is placed on the flange 12. A yoke 14 is fixed under the flange 12. A drive magnet 15 is fixed on the inner surface of the yoke 14 and opposed to a stator coil 16 placed under the yoke. The drive magnet 15 and stator coil 16 form a drive motor. The rotating shaft 11 is fitted into an inner ring of a ball bearing 18 pressed into a housing 17. The housing 17 thus holds the bearing of the drive motor.

The housing 17 is usually made of a metal member such as a brass or the like. An upper flange 17a and a lower flange 17b are integrally molded. The housing 17 is fitted into a hole 19a of an optical case 19. A compression coil spring 20 intervenes between the optical case 19 and the lower flange 17b of the housing 17.

The compression coil spring 20 presses the lower flange 17b in the A direction. Thereby, the bottom surface of the upper flange 17a is pushed on the optical case 19, and thus the housing 17 fixed in the optical case 19. The outer diameters of the upper flange 17a and lower flange 17b are slightly larger than the diameter B of the body of the housing 17. The procedure of mounting the housing 17 in the optical case 19 will be described in detail in conjunction with FIGS. 4 and 5.

As described above, according to the present invention, a compression coil spring 20 is used to fix a housing 17 in an optical case 19. This obviates screwing, and results in a compact and lightweight housing 17 or reduced cost. Furthermore, the number of parts or man-hours decreases.

Figure 3:
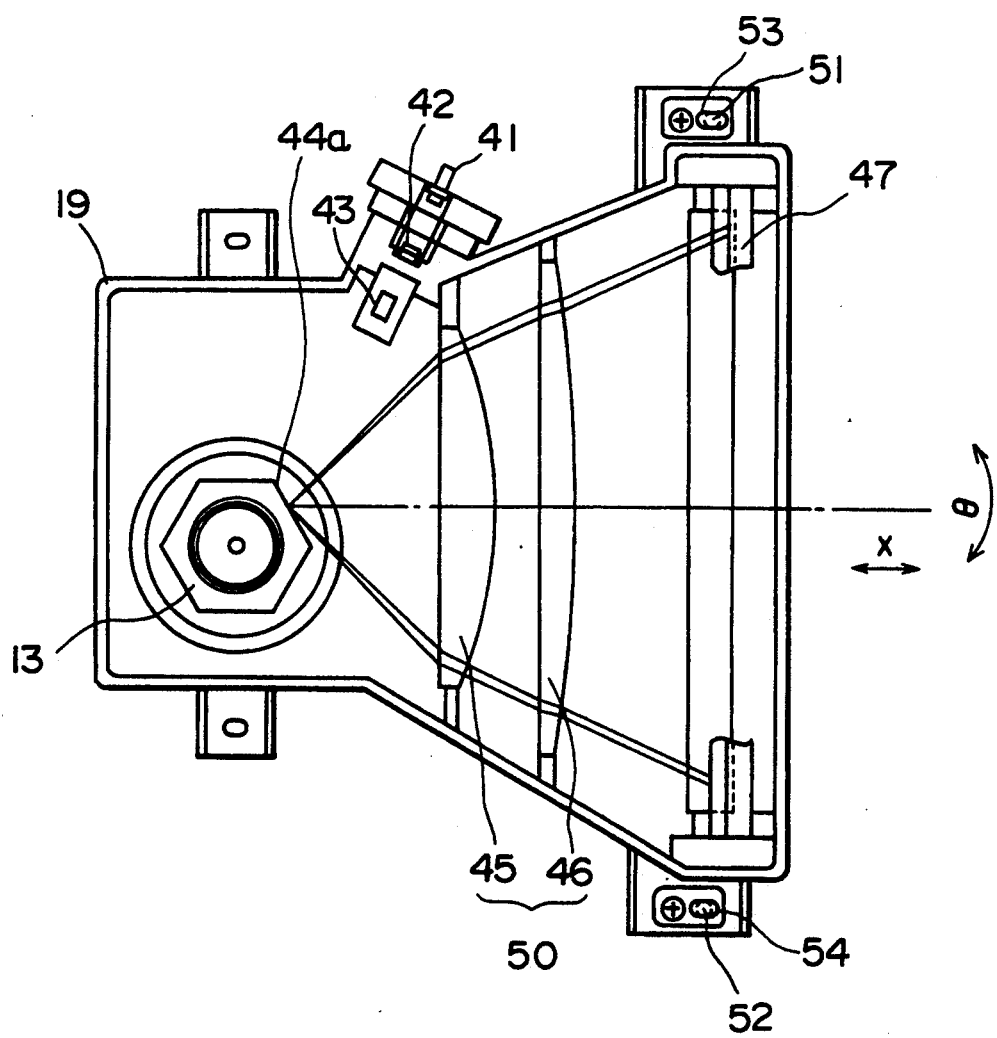
FIG. 3 is a plan view showing the first embodiment.

FIG. 3 is a plan view for explaining an overall configuration of the first embodiment of a deflection scanner according to the present invention. The deflection scanner is employed in a laser beam printer for scanning a beam over a photosensitive body. FIG. 3 helps explain the function in a cross section parallel to a deflecting surface (surface of a bundle of rays formed time-sequentially by a beam that has deflected by a deflection reflecting surface of a deflector). Herein, a rotary polygon mirror is mounted in an optical case 19 as described in conjunction with FIG. 2.

A deflection scanner is contained in a scanner main unit (optical case) 19. FIG. 3 is a plan view of the main unit with its cover removed. The deflection scanner comprises a semiconductor laser 41, a collimator lens 42 for converting a beam emitted from the semiconducting laser 41 into parallel beam, a cylindrical lens 43 for linearly converging the parallel beam from the collimator lens 42, a rotary polygon mirror 13 having a deflection reflecting surface 44a in the vicinity of a linear image of the beam converged by the cylindrical lens 43, and fθ lenses 50. A beam deflected and reflected from the deflection reflecting surface 44a incident on a reflection mirror 47 via the fθ lenses 50, and then is reflected by the reflection mirror 47 to irradiate a photosensitive body, which is not shown.

The fθ lenses 50 are designed so that a beam reflected from the deflection reelecting surface 44a will form a spot on the photosensitive body and the scanning speed of the spot will be held constant. In an effort to provide the fθ lenses 50 with these properties, a spherical lens 45 and a toric lens 46 are employed as the fθ lenses 50.

With rotation of the rotary polygon mirror 13, the main scanning is conducted on the photosensitive body by the light beam. When the photosensitive body rotates around its cylindrical axis, sub-scanning is carried out. Thus, an electrostatic latent image is formed on the surface of the photosensitive body.

Arranged around the photosensitive body are a corona discharge tube for charging the surface of the photosensitive body uniformly, a visualizing unit for visualizing the electrostatic latent image produced on the surface of the photosensitive body by producing a toner image, a transfer corona discharge tube for transferring the toner image onto recording paper, all of which are not shown. These equipment work to print recording information on recording paper according to the beam generated from the semiconductor laser 41.

As shown in FIG. 3, a beam-applied position of a scanner main unit 19 is adjusted using positioning pins 51 and 52 provided outside the scanner main unit 19. Numeral 53 denotes a guide hole for the positioning pin 51. Numeral 54 denotes a guide hole for the positioning pin 52. The beam-applied position of the scanner main unit 19 in the X-direction is adjusted by moving the positioning pins 51 and 52 in the same direction along the x axis. The adjustment of the scanner main unit 19 in the θ direction is performed by moving the positioning pins 51 and 52 in the opposite directions along the x axis. Thus, the scanner main unit 19 is rotated in the θ direction.

Figure 4:
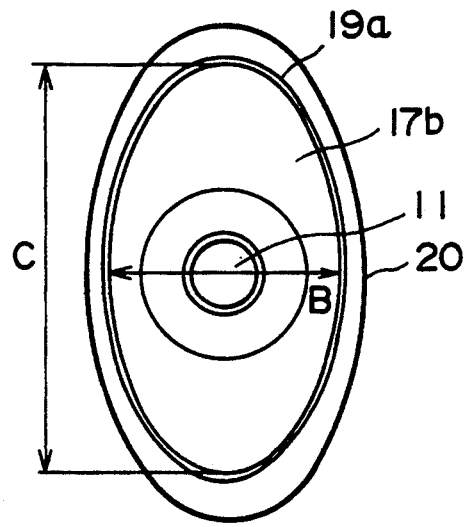
FIGS. 4 and 5 are explanatory diagrams for explaining how to mount a housing in an optical case.
Figure 5:
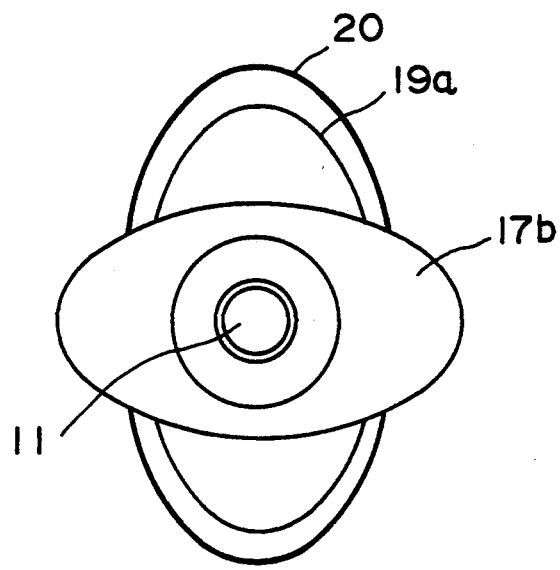

FIGS. 4 and 5 explain how to mount a housing 17 in an optical case 19. In the figures, the optical case 19 is viewed from below (on the reverse side of a rotary polygon mirror 13).

A lower flange 17b is molded in the shape of an ellipse whose body has a diameter B and whose projecting section has a diameter C. A hole 19a of the optical case 19 is shaped like an ellipse and is slightly larger than the elliptic lower flange 17b. A compression coil spring 20 for fixing the housing 17 in the optical case 19 is shaped like an ellipse and is slightly larger than the elliptic hole 19a.

As shown in FIG. 4, three ellipses of the lower flange 17b, the hole 19a of the optical case 19, and the compression coil spring 20 are joined, and thus the housing 17 is fitted into the optical case 19.

After the housing 17 is fitted into the optical case 19, as shown in FIG. 5, the housing 17 is rotated by an angle of 90°. Thereby, the compression coil spring 20 locks the housing 17 in the optical case 19.

Figure 6:
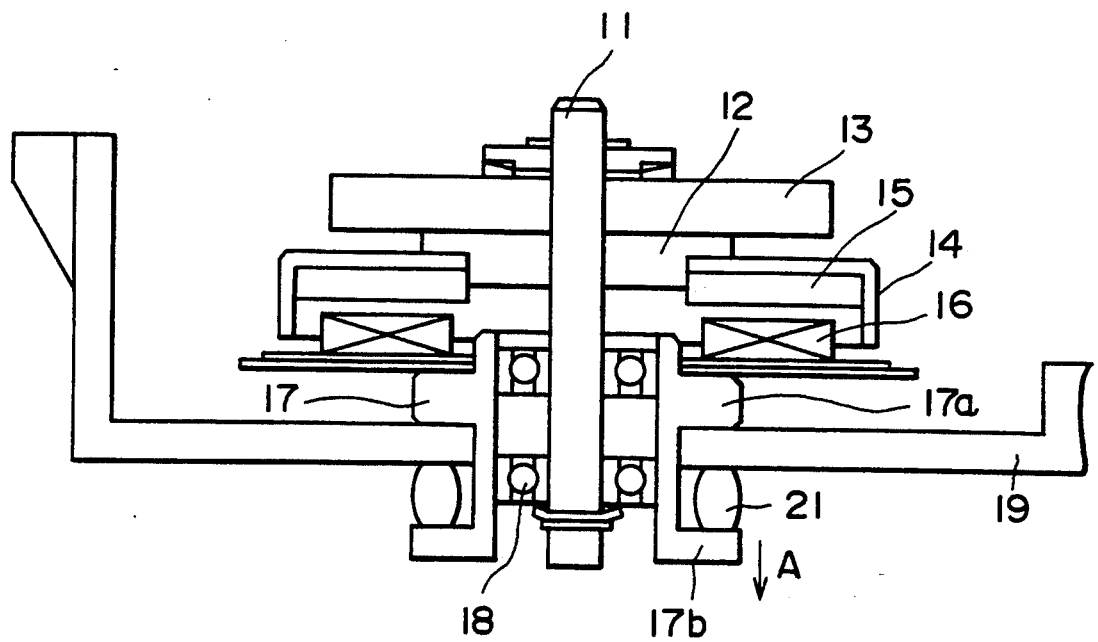
FIG. 6 is a cross-sectional diagram showing the second embodiment.

FIG. 6 is a cross-sectional diagram showing the second embodiment. The basic configuration of the scanner is identical to that of the one in the first embodiment. An elastic sleeve 21 made of a resin or rubber is used instead of a compression coil spring 20 in the first embodiment. The sleeve 21 is compressed to some extent and mounted between an optical case 19 and a lower flange 17b. The sleeve 21 presses the lower flange 17b in the A direction similarly to the compression coil spring 20 in the first embodiment. Thereby, the housing 17 is pressed and fixed into the optical case 19.

Figure 7:
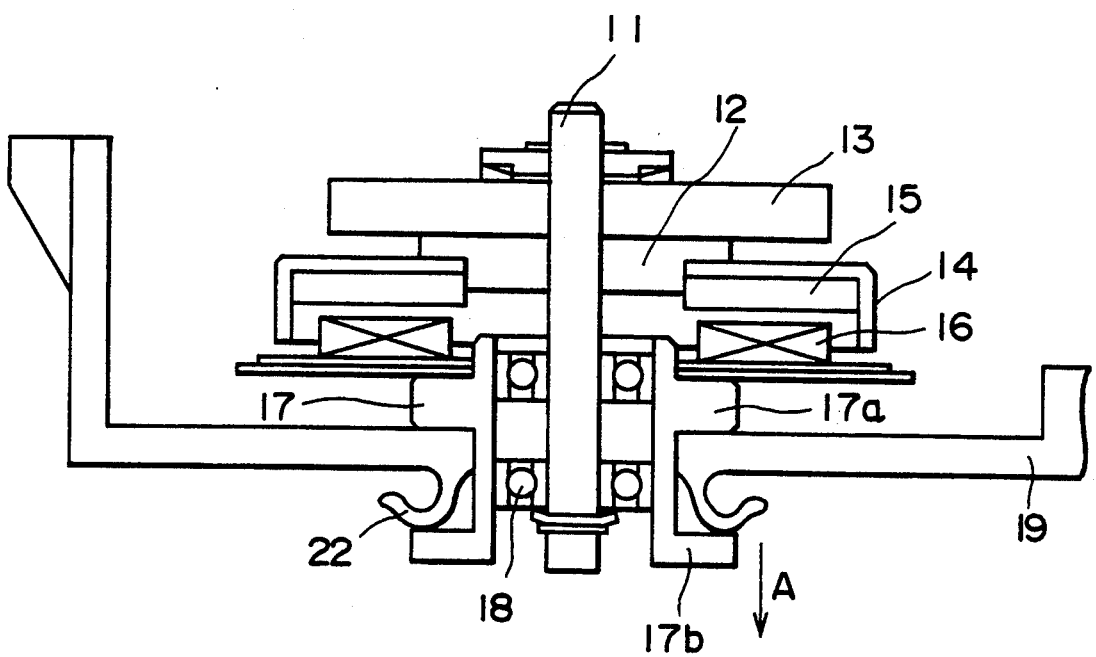
FIG. 7 is a cross-sectional diagram showing the third embodiment.

FIG. 7 is a cross-sectional diagram showing the third embodiment. The basic configuration of the scanner is identical to that of the one in the first embodiment. An elastic projection 22 is integrally molded with a molded optical case 19 at the under surface thereof. When a housing 17 is locked in the optical case 19, the projection 22 opens outward and warps. Then, while resuming the original state, the projection 22 presses a lower flange 17b in the A direction. Thus, the housing 17 is pressed and locked into the optical case 19. The projection 22 is provided outside the optical case 19 (on the reverse side of a means for converging a light beam on a scanning object).

The third embodiment provides the same advantages as the first and second embodiments do. Moreover, since am elastic member; such as, a compression coil spring 20 and a sleeve 21 employed in the first and second embodiments is unnecessary, further reduction in cost is accomplished.

Figure 8:
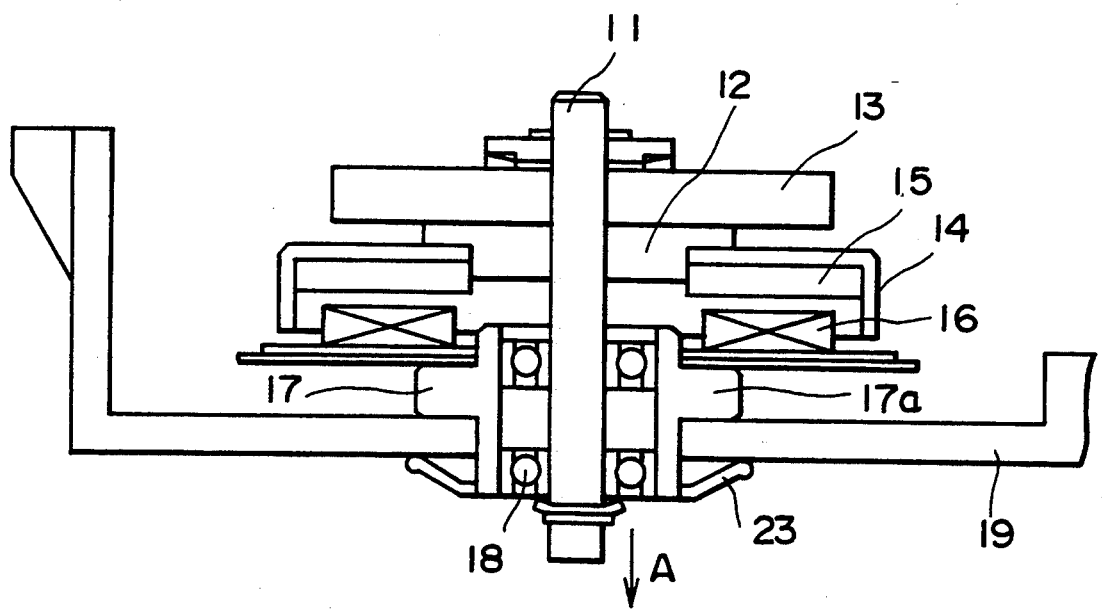
FIG. 8 is a cross-sectional diagram showing the fourth embodiment.

FIG. 8 is a cross-sectional diagram showing the fourth embodiment. The basic configuration of the scanner is identical to that of the one in the first embodiment. A lower flange 17b employed in the first to third embodiments is displaced by an elastic leg 23 that is extending from the bottom of a housing 17 and molded as part of the housing 17.

In this embodiment, the elastic leg 23 warps to press the housing 17 in the A direction. Thus, the housing 17 is locked in an optical case 19.

As described above, a deflection scanner according to the present invention employs an elastic member instead of screws as a means for locking a housing in an optical case. This realizes a compact housing, lightens the weight of the scanner, and decreases the number of parts. Reduced cost results.

A deflection scanner according to the present invention can apply to a rotator held with a hydrodynamic bearing.

There is an increasing demand for a rotator capable of rotating at a high speed or with high precision in recent years. For a laser beam printer, a hydrodynamic bearing that rotates in a non-contact state is employed.

Figure 9:
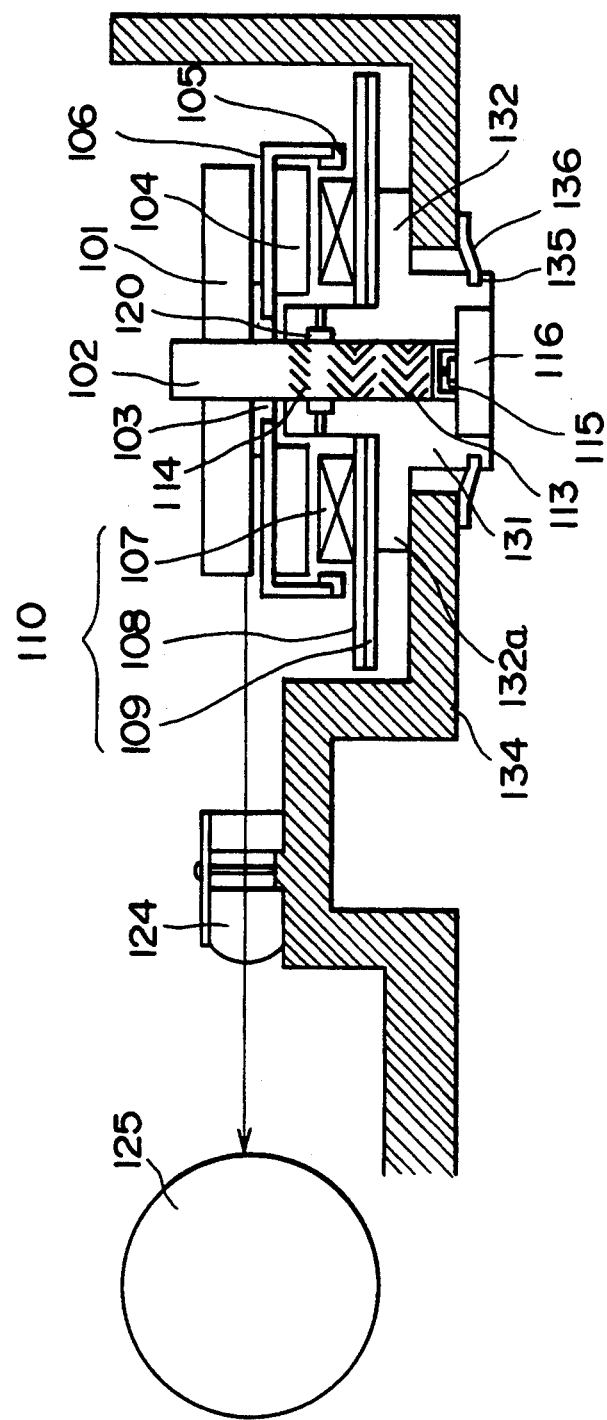
FIG. 9 is a cross-sectional diagram showing the fifth embodiment.
Figure 10:
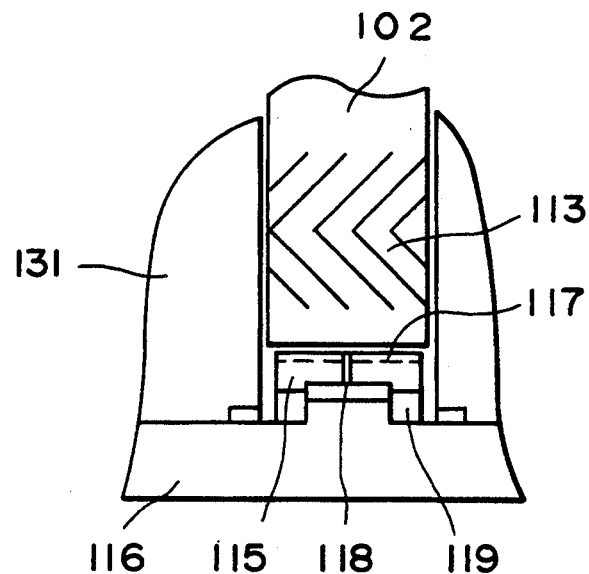
FIG. 10 shows an enlarged cross section of a bearing.

FIG. 9 is a cross-sectional diagram of the fifth embodiment of a deflection scanner for a laser beam printer using a hydrodynamic bearing. FIG. 10 shows an enlarged cross section of the bearing. A rotary polygon mirror 101 is fixed on the top of a flange 103 of a rotating shaft 102. A rotor 106 on which a drive magnet 104 and an FG magnet 105, which form a drive motor, and mounted is fixed on the bottom surface of the flange 103. A stator coil 107 is disposed at a position opposed to the drive magnet 104 and the stator coil 107 is fixed on a printed board 108 on which an FG pattern is printed. A Hall element, which is not shown, and a drive circuit and a control circuit formed on the printed board 108 control power supply to the stator coil 107 so as to control rotation of the drive motor. A yoke 109 of an iron plate is secured on the printed board 108 so that the magnetic field of the drive magnet 104 will work on the stator coil 107 effectively. The stator coil 107, printed board 108, and yoke 109 constitute a motor board 110. The motor board 110 is joined with a stationary member (housing 132) for securing a hydrodynamic bearing.

The rotating shaft 102 is rotatably fitted into a sleeve 131 fixed in the housing 132 or a member for securing the hydrodynamic bearing. Shallow grooves 113 for generating a dynamic pressure are formed on the outer circumferential surface of the rotating shaft 102 to draw a pattern of herring bones. Thus, a dynamic radial bearing is constituted. Shallow grooves 114 are formed on the outer circumferential surface of the rotating shaft 102 in the vicinity of the opening of the sleeve 131 to draw a spiral pattern, so that lubricating fluid will flow downward in the sleeve. A thrust plate 115 is placed on a fixed plate 116 in the lower part of the sleeve 131. Shallow grooves 117 are formed on the surface of the thrust plate 115 to draw a spiral pattern. Thus, a dynamic thrust bearing is constituted. A hole 118 and a groove 119 are formed for circulating the lubricating fluid. An annular recess 120 and at least one small-diameter hole are formed at the side of the sleeve between the shallow grooves 113 and 114 formed on the portion of the outer circumferential surface of the rotating shaft 102. This ensures the stability of the hydrodynamic bearing using lubricating fluid.

As shown in FIG. 9, on the top of a flange 132a of a housing 132 having a stationary member or a sleeve 131, a motor board 110 is secured with adhesive or screws. The bottom surface of the flange 132a serves as a mounting reference surface relative to an optical case 134. A groove 135 is formed along the outer circumferential surface of the sleeve 31 in the lower part of the housing 132. An elastic member 130 such as a plate spring or the like is fitted into the groove from outside the optical case 134. Thereby, the housing 132 serving as a stationary member of a drive motor is locked in the optical case 134. After the housing 132 is placed in the optical case 134, the elastic member 136 is fitted to lock the housing 132 in the optical case 134.

Image formation lenses 124 are arranged in the optical case 134 and opposed to a photosensitive drum 125.

A laser beam emitted from a light source that is not shown is deflected and scanned by a rotary polygon mirror 101, the image of the laser beam formed on the photosensitive drum 125 through the image formation lenses 124.

The overall configuration of the aforesaid deflection scanner of the fifth embodiment is identical to that of the first embodiment described in conjunction with FIG. 3.

In the aforesaid configuration, the bottom of a flange 132a of a housing 132 serves as a mounting reference surface relative to an optical case 134. This leads to decrease in the outer diameter of a stationary member. Moreover, it is ease to manufacturing the stationary member in which the sleeve 131 and the housing 132 are integrally formed.

Therefore, when the sleeve 131 is processed, the inner circumferential surface of the sleeve 131 acting as a radial bearing, a joint surface of the sleeve 131 on which the sleeve 131 is joined with a thrust plate 115 acting as a thrust bearing, the bottom of the flange 132a of the housing 132 serving as a mounting reference surface relative to the optical case 134 can be processed simultaneously and easily. This improves precision and reduces cost. Furthermore, only an elastic member 136 is used to secure a drive motor. Therefore, the number of parts including screws decreases and the man-hours required for assembly diminishes. This leads to reduce cost.

Figure 11:
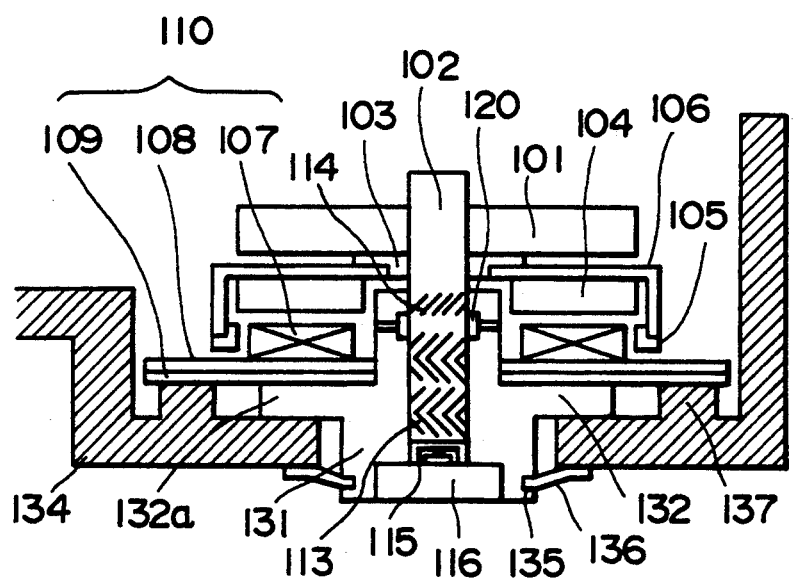
FIG. 11 is a cross-sectional diagram showing the sixth embodiment.

FIG. 11 is a cross-sectional diagram showing the sixth embodiment. At least one projection 137 is formed in part of an optical case 134 so that the projection 137 abuts against the bottom surface of a motor board 110. The basic configuration of the scanner is identical to that of the one in the fifth embodiment.

The projection 137 functions to support the motor board 110 when a housing 132 or a stationary member of a drive motor and an optical case 134 are locked by means of an elastic member 136. That is to say, when the drive motor rotates, the projection 137 prevents the motor board 110 from oscillating. When a connector is inserted into the motor board 110, the projection 137 prevents the motor board 110 from deforming. This improves precision and simplifies assembly.

Figure 12:
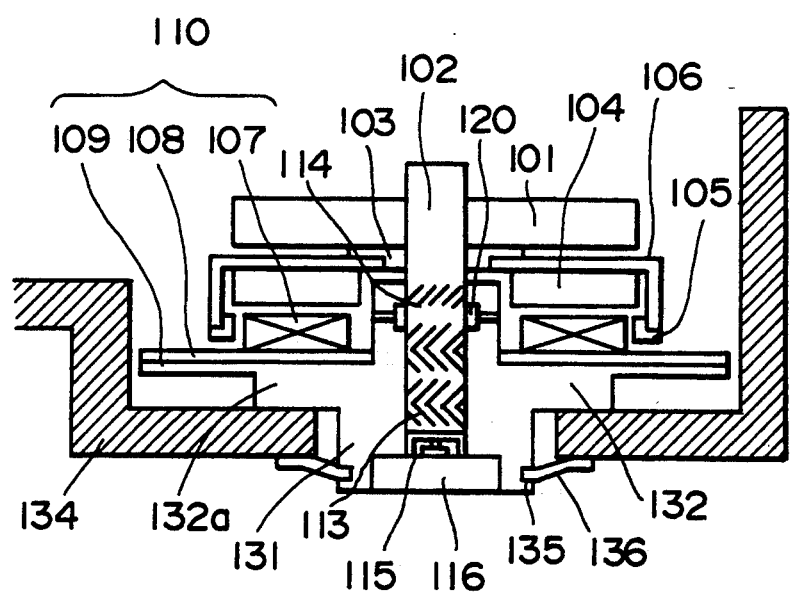
FIG. 12 is a cross-sectional diagram showing the seventh embodiment.

FIG. 12 is a cross-sectional diagram showing the seventh embodiment. The basic configuration of the scanner is identical to that of the one in the fifth embodiment. A housing 132 is made of a ferrous metal or a magnetic material. A yoke 109 that is a component of a motor board 110 is integrally formed with the housing 132. The housing 132 is made of the material mentioned above. Therefore, it is preferred that the inner surface of a seleve 131 be finished with nickel or chromium.

Thus, a stator coil 107 or a printed board 108 is placed on the yoke 109 integrally formed with the housing 132. This results in a simple configuration.

In the fifth to seventh embodiments, the explanation is made in a case where the sleeve acts as a stationary member and the shaft rotates. The same advantages as those mentioned above are promised even when the sleeve rotates and the shaft is stationary.

In the aforesaid deflection scanners according to the present invention, a deflector for deflecting a beam emitted from a light source is rotated by a drive motor held with a hydrodynamic bearing. A container accommodates the deflector, the drive motor, and a means for converging a light beam on a scanning surface. Herein, a stationary member for the hydrodynamic bearing is fixed on the container by the elastic member.

As described previously, in a deflection scanner according to the present invention, a housing which is a stationary member for a hydrodynamic bearing and an optical case are locked by an elastic member. This realizes a compact housing, assures precision of an optical case mounting surface, and decreases the number of parts. Eventually, cost is reduced.

Figure 13:
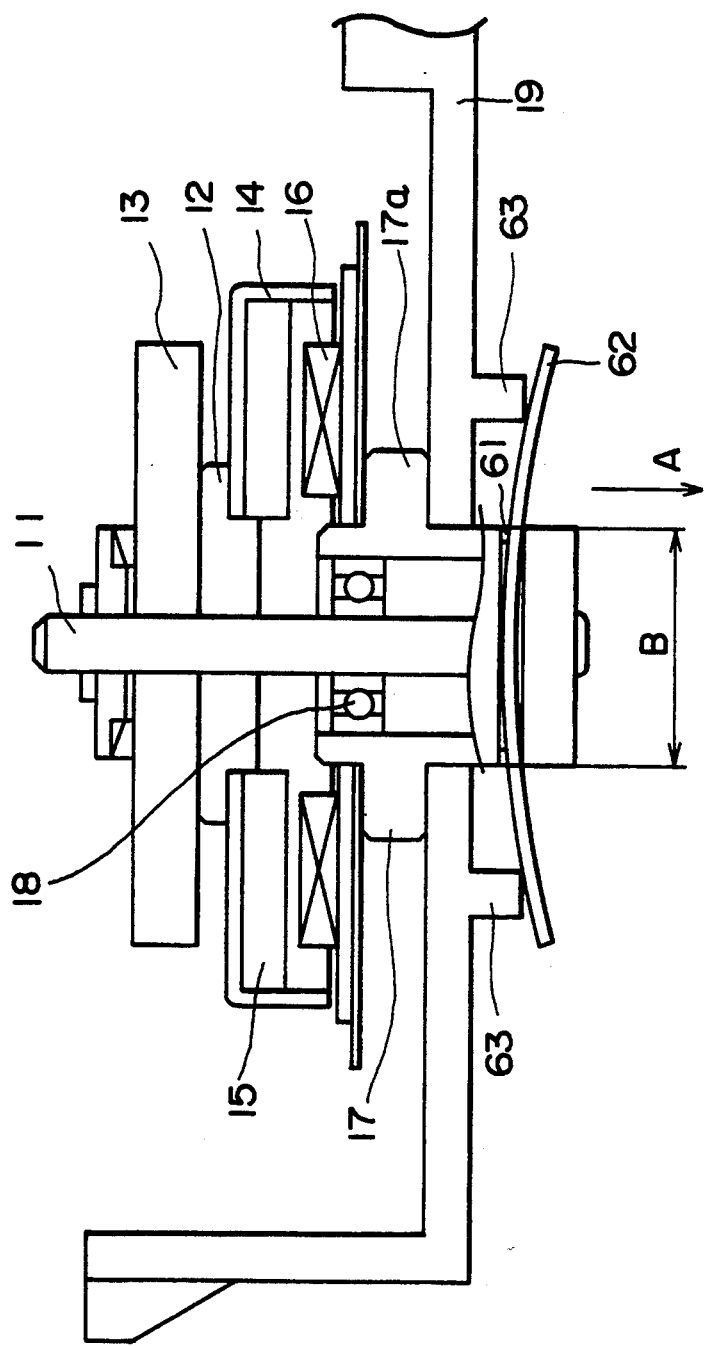
FIG. 13 is a cross-sectional diagram for explaining a polygon mirror section in the eighth embodiment of a deflection scanner according to the present invention.

FIG. 13 is a cross-sectional diagram showing the eighth embodiment. The basic configuration of the scanner is identical to that of the one in the first embodiment. The detailed description will be omitted. An enlarged cross section of a polygon mirror unit will be discussed.

Figure 14:
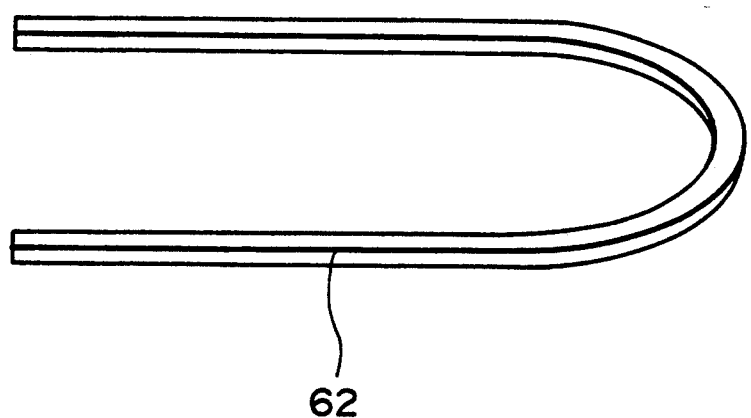
FIG. 14 is a perspective view for explaining the configuration of a wire spring.

In FIG. 13, numeral 13 denotes a polygon mirror. The mirror is fixed on a washer 12 crimped on a rotor 14. A motor shaft 11 is pressed into the washer 12. A drive magnet 15 is fixed on the inner surface of the rotor 14 by an adhesive or the like. A stator coil 16 is placed under the drive magnet 15, which rotates the rotor 14. The motor shaft 11 is fitted into an inner ring of a ball bearing 18 pressed into a motor housing 17. The housing 17 is made of brass or other metal, wherein a flange 17a and a groove 61 are integrally formed. The housing 17 is positioned by abutting the bottom surface of the flange 17a against an optical case 19. After the housing 17 is mounted in the optical case 19, a wire spring 62 configured as shown in FIG. 14 is fitted in the groove 61 formed on the housing 17 from below. Then, the ends of the wire spring 62 are held with a projection 63 integrally formed with the optical case 19 as shown in FIG. 13. Thus, the housing 17 is pressed in the A direction and locked in the optical case 19. The diameter of the flange 17a may be slightly larger than the diameter B of the body of the housing 17.

In this embodiment, a ball bearing is employed as a bearing. The embodiment can, needless to say, apply to other various well-known bearings.

As described previously, according to the eighth embodiment, a motor housing is fixed in an optical case as follows: the housing is mounted on the optical case, then a wire spring is installed from below. Thereby, the housing need not be screwed to the optical case. This realizes a compact and lightweight housing, simplifies assembly, decreases the number of parts, and eventually reduces the cost of a deflection scanner.

Figure 15:
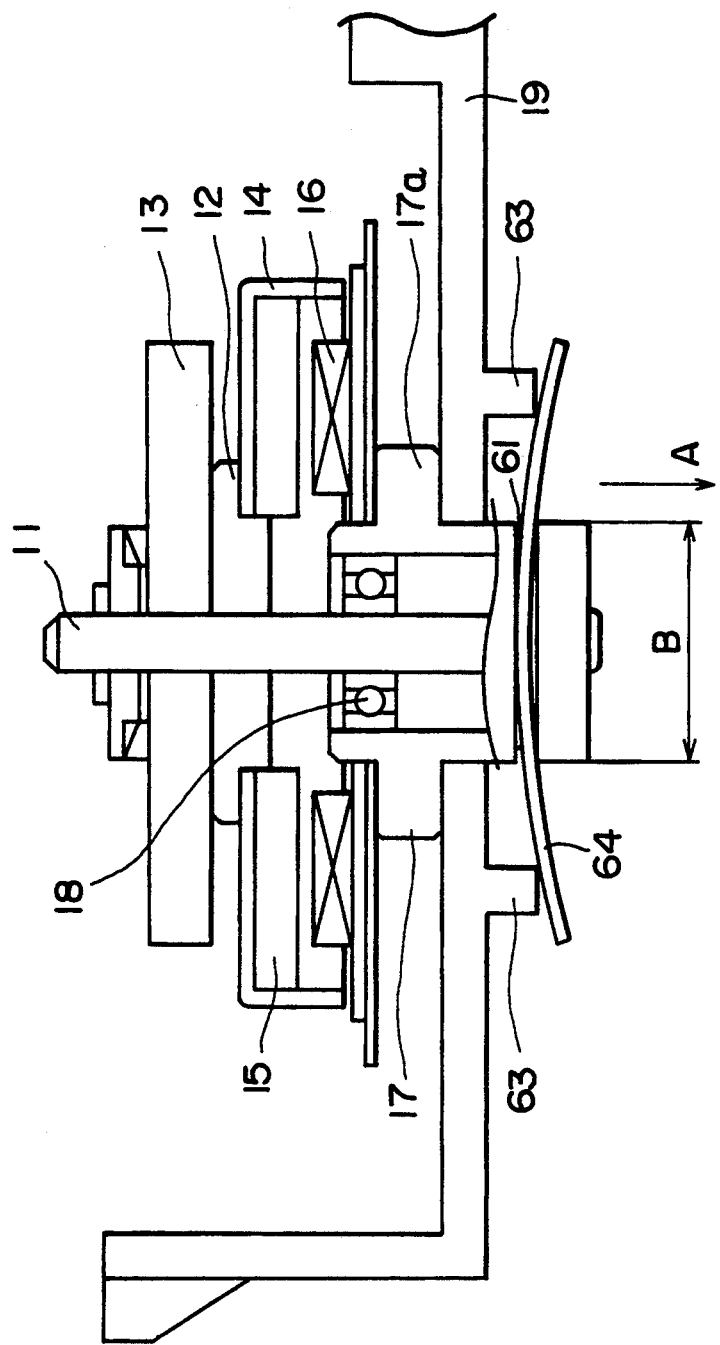
FIG. 15 is a cross-sectional diagram for explaining a polygon mirror section in the ninth embodiment of a deflection scanner according to the present invention.

FIG. 15 shows the ninth embodiment of a deflection scanner according to the present invention. In FIG. 15, the members having the same functions as those in the eighth embodiment are assigned the same numerals. The description will be omitted. Herein, an enlarged cross section of a polygon mirror unit is shown in FIG. 15.

Figure 16:
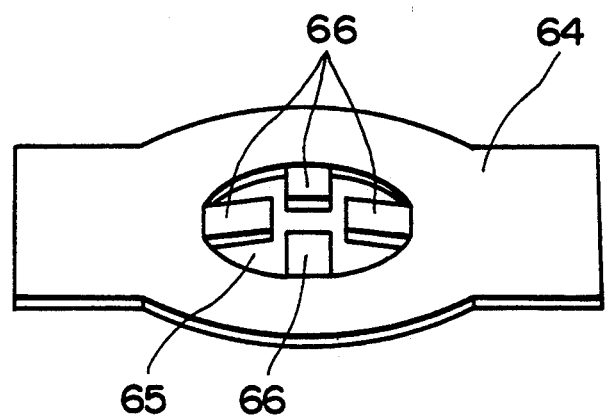
FIG. 16 is a perspective view for explaining the configuration of a plate spring.

In the eighth embodiment, a wire spring is used to lock a housing 17 in an optical case 19. In the ninth embodiment, a plate spring 64 shown in FIG. 16 is employed. The plate spring 64 has a hole 65 and claws 66 that which are integrally formed.

The diameter of the hole 65 is slightly larger than the outer diameter B of the housing 17. The inner diameter formed with the claws 66 is smaller than the outer diameter B but slightly larger than the diameter of a groove 61.

After the housing 17 is mounted in the optical case 19, the plate spring 64 is installed from below. Then, the claws 66 warp downward because of the invasion of the housing 17. The claws 66 return to the original state when they match the groove 61. Thus, the claws 66 prevent the plate spring 64 from coming off. The ends of the spring 64 are held with a projection 63. Thus, the housing 17 is pressed in the A direction and locked in the optical case 19.

The advantages in this embodiment are identical to those in the eighth embodiment. Employment of a plate spring instead of a wire spring is more favorable for mass production.

Figure 17:
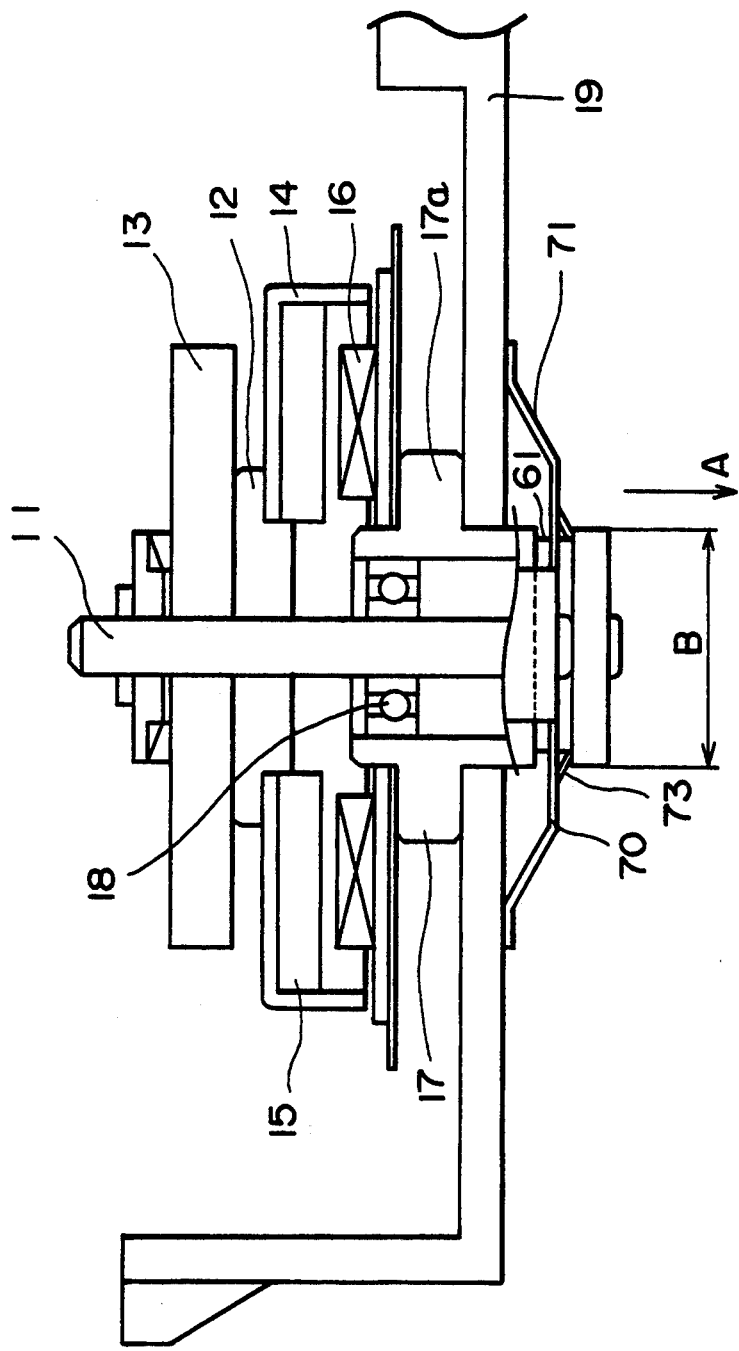
FIG. 17 is a cross-sectional diagram for explaining a polygon mirror section of the tenth embodiment of a deflection scanner according to the present invention.

FIG. 17 shows the tenth embodiment of a deflection scanner according to the present invention.

The members having the same functions as those in the eighth embodiment are assigned the same numerals. The description will be omitted. Herein, a partly enlarged view of a polygon mirror unit is shown in FIG. 17.

Figure 18:
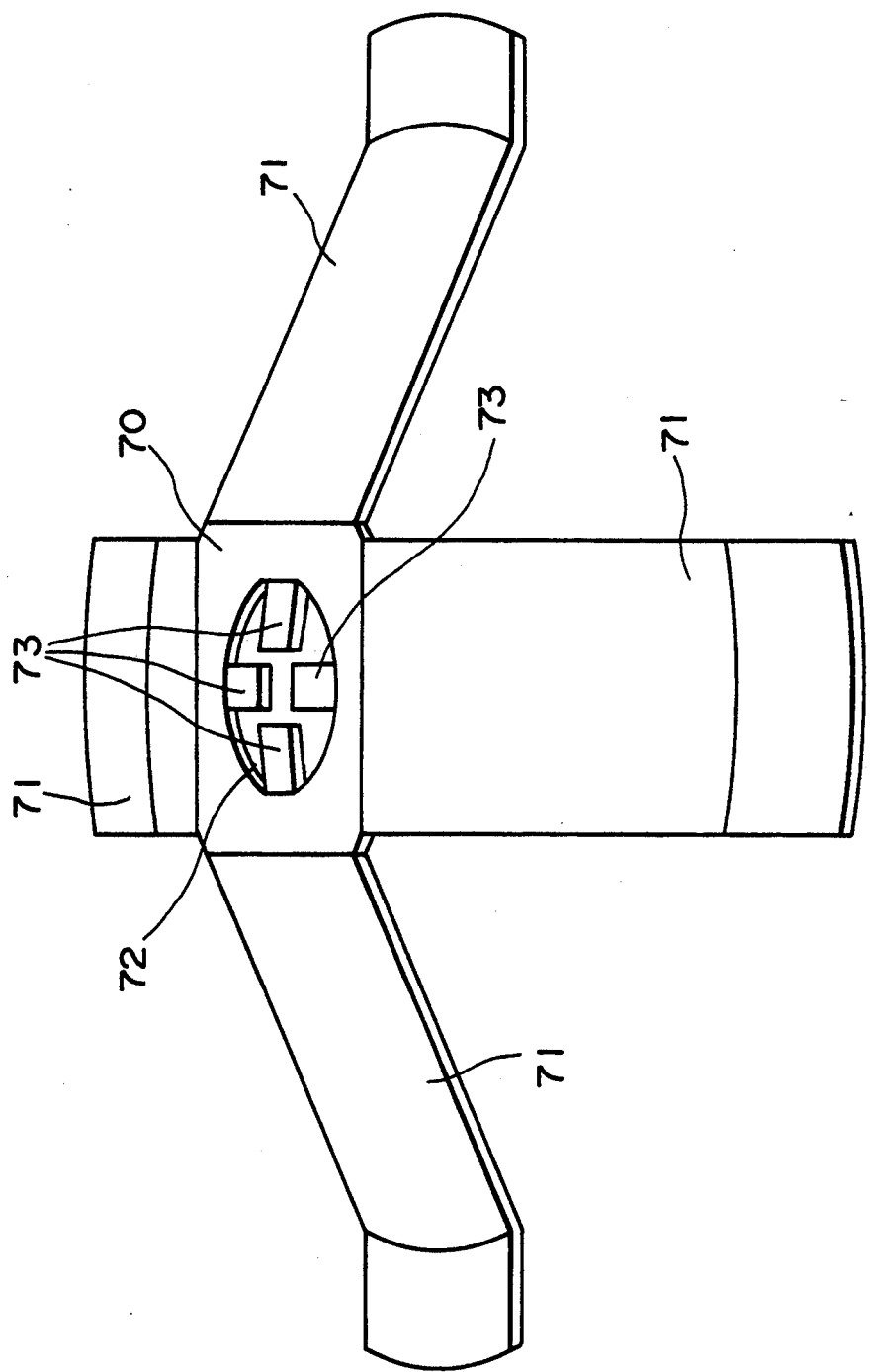
FIG. 18 is a perspective view for explaining the configuration of a plate spring.

In the ninth embodiment, the ends of a plate spring are held with a projection. In this embodiment, as shown in FIG. 18, legs 71 are integrally formed with a plate spring 70. The legs 71 warp to apply a load. The spring 70 has a hole 72 and claws 73 which are integrally formed with the spring 70. The relationships of the diameter of the hole 72 and the inner diameter formed with the claws 73 with respect to the outer diameter B of the housing are identical to those in the ninth embodiment. The procedure of mounting the spring 70 and the advantages are identical to those in the ninth embodiment. The description will be omitted.

A deflection scanner according to the present invention comprises a deflector for deflecting a beam emitted from a light source, a drive motor for rotatably driving the deflector, and a container for accommodating therein an optical means for converging the beam deflected by the deflector. A groove is formed along the outer circumference of a member for holding a bearing of the drive motor. An elastic member installed from outside the container is engaged with the groove and held with the container. Thus, a member for holding the bearing of the drive motor is locked in the container.

As described previously, according to the present invention, in a deflection scanner for deflecting and scanning a laser beam by rotating a polygonal mirror by a drive motor, an elastic member is employed instead of screws as a means for locking a housing containing a ball bearing into an optical case such that the elastic member is engaged with a groove of the housing and held with an optical case. This realizes a compact housing. Furthermore, since screws for securing the housing can be abandoned, the weight of the scanner lessens, the number of parts decreases, and the man-hours diminishes. This leads to reduce cost.

What is claimed is:

1. A deflection scanner, comprising:
a light source;
deflecting means for deflecting a light beam emitted from said light source;
driving means including a rotatable bearing for rotating said deflecting means;
supporting means for supporting the bearing of said driving means;
storage means for accommodating said supporting means; and
elastic means for elastically fixing said supporting means in said storage means.

2. A deflection scanner according to claim 1, wherein said elastic means is comprised by a coil spring.

3. A deflection scanner according to claim 1 wherein said elastic means is made of a resin or rubber.

4. A deflection scanner according to claim 1 wherein said elastic means is integrally molded with said storage means.

5. A deflection scanner according to claim 1 wherein said elastic means is formed outside said storage means.

6. A deflection scanner according to claim 1, wherein said elastic means is comprised by a wire spring.

7. A deflection scanner according to claim 1, wherein said elastic means is comprised by a plate spring.

8. A deflection scanner according to claim 1, wherein said elastic means is supported by a projection from said storage means.

9. A deflection scanner according to claim 8, wherein said elastic means is held with a groove formed on said projection.

10. A deflection scanner according to claim 1, wherein the rotatable bearing of said driving means is comprised by a hydrodynamic bearing.

11. A laser beam printer, comprising:
a light source;

deflecting means for deflecting a beam emitted from said light source;

driving means including a rotatable bearing for rotating said deflecting means;

supporting means for supporting the bearing of said driving means;

storage means for accommodating said supporting means;

elastic means for elastically fixing said supporting means in said storage means; and a photosensitive body for receiving the light beam deflected by said deflecting means.

12. A laser beam printer according to claim 11, wherein said elastic means is comprised by a coil spring.

13. A laser beam printer according to claim 11 wherein said elastic means is made of a resin or rubber.

14. A laser beam printer according to claim 11 wherein said elastic means is integrally molded with said storage means.

15. A laser beam printer according to claim 11 wherein said elastic means is formed outside said storage means.

16. A laser beam printer according to claim 11, wherein said elastic means is comprised by a wire spring.

17. A laser beam printer according to claim 11, wherein said elastic means is comprised by a plate spring.

18. A laser beam printer according to claim 11, wherein said elastic means is supported by a projection from said storage means.

19. A laser beam printer according to claim 18, wherein said elastic means is held with a groove formed on said projection.

20. A laser beam printer according to claim 11, wherein the rotatable bearing of said driving means is comprised by a hydrodynamic bearing.

21. A light deflector, comprising:

deflecting means;

driving means including a rotatable bearing for rotating said deflecting means;

supporting means for supporting the bearing of said driving means;

storage means for accommodating said supporting means; and elastic means for elastically fixing said supporting means in said storage means.

22. A light deflector according to claim 21, wherein said elastic means is comprised by a coil spring.

23. A light deflector according to claim 22 wherein said elastic means is made of a resin or rubber.

24. A light deflector according to claim 22 wherein said elastic means is integrally molded with said storage means.

25. A light deflector according to claim 22 wherein said elastic means is formed outside said storage means.

26. A light deflector according to claim 21, wherein said elastic means is comprised by a wire spring.

27. A light deflector according to claim 21, wherein said elastic means is comprised by a plate spring.

28. A light deflector according to claim 21, wherein said elastic means is supported by a projection from said storage means.

29. A light deflector according to claim 28, wherein said elastic means is held with a groove formed on said projection.

30. A light deflector according to claim 21, wherein the rotatable bearing of said driving means is comprised by a hydrodynamic bearing.

31. A method of fixing a housing of a drive motor in a container in a deflection scanner, comprising the steps of:

a step of putting said housing which supports a bearing of said drive motor for driving a deflector into said container; and a step of elastically locking said housing in said container by use of an elastic member.

32. A deflection scanner for deflectively scanning a light beam on a photosensitive surface, said deflection scanner comprising:

a rotatable deflector which includes a plurality of reflecting surfaces for deflecting the light beam, said rotatable deflector being mounted for rotation about a shaft member;

drive means for rotatably driving said deflector, said drive means including an axially aligned collar and a bearing mounted in the collar, the bearing for rotatably supporting the shaft member;

a housing for mounting the driving means, said housing including a through hole for receiving the collar; and elastic fixing means, co-acting with said housing and said collar, for elastically seating said drive means against the housing.

33. A deflection scanner according to claim 32, wherein said collar includes a terminating flange and wherein said elastic fixing means is comprised by a coil spring co-acting between the housing and the flange.

34. A deflection scanner according to claim 32, wherein said collar includes a terminating flange and wherein said elastic fixing means is comprised by resin or rubber co-acting between the housing and the flange.

35. A deflection scanner according to claim 32, wherein said elastic fixing means is integrally molded with said housing.

36. A deflection scanner according to claim 32, wherein said collar includes an annular groove, and wherein said elastic fixing means is comprised by a wire spring seated in the groove and co-acting with the housing.

37. A deflection scanner according to claim 32, wherein said collar includes an annular groove, and wherein said elastic fixing means is comprised by a plate spring seated in the groove and co-acting with the housing.

* * * * *